(12) United States Patent
Seitz

(10) Patent No.: US 7,246,860 B1
(45) Date of Patent: Jul. 24, 2007

(54) WHEEL PLUGS FOR VEHICLE WHEELS

(76) Inventor: Gary R Seitz, 977 Wilson Rd., Venus, PA (US) 16364

( * ) Notice: Subject to any disclaimer, the term of this patent is extended or adjusted under 35 U.S.C. 154(b) by 155 days.

(21) Appl. No.: 11/163,068

(22) Filed: Oct. 4, 2005

(51) Int. Cl.
*B60B 7/04* (2006.01)

(52) U.S. Cl. .............................. 301/37.28; 301/37.101; 301/37.108; 301/37.106; 220/789

(58) Field of Classification Search ........... 301/37.101, 301/37.28, 37.106, 37.108, 37.31, 37.26, 301/37.105; 220/780, 787, 789, 790, 791, 220/801, 233, DIG. 19
See application file for complete search history.

(56) References Cited

U.S. PATENT DOCUMENTS

| | | | |
|---|---|---|---|
| 2,157,960 A | 5/1939 | Lyon | 301/37 |
| 2,248,707 A | 7/1941 | Horn | 301/6 |
| 2,629,957 A | 3/1953 | Lyon | 41/34 |
| 2,665,947 A | 1/1954 | Lyon | 301/37.107 |
| 3,337,271 A | 8/1967 | Lyon | 301/37 |
| 3,367,722 A | 2/1968 | Miyanaga | 301/108.1 |
| 3,945,529 A * | 3/1976 | Haag | 220/254.1 |
| 5,163,797 A | 11/1992 | Patti | 411/431 |
| D332,441 S | 1/1993 | Douglas | D12/204 |
| 5,286,092 A | 2/1994 | Maxwell, Jr. | 301/37.37 |
| 5,316,376 A | 5/1994 | Defreitas | 301/37.26 |
| 5,441,334 A | 8/1995 | Botterman et al. | 301/37.11 |
| 5,458,401 A | 10/1995 | Baccman | 301/37.43 |
| 5,505,525 A | 4/1996 | Denton | 301/108.4 |
| 5,667,281 A | 9/1997 | Ladouceur | 301/37.375 |
| 5,988,762 A | 11/1999 | Asada et al. | 301/37.1 |
| 6,439,670 B1 | 8/2002 | Winters | 301/37.101 |
| 6,464,303 B2 | 10/2002 | Stembridge | 301/37.31 |
| 6,517,168 B1 | 2/2003 | Van Houten | 301/37.42 |
| 6,637,829 B1 | 10/2003 | Jenkins | 301/37.108 |
| 6,669,305 B2 | 12/2003 | Ichikawa | 301/37.28 |
| 6,805,413 B2 | 10/2004 | Fitzgerald | 301/37.106 |
| 6,820,475 B2 | 11/2004 | Wallach | 73/146 |
| 2002/0113485 A1 | 8/2002 | Ketter et al. | 301/37.108 |
| 2003/0001430 A1 | 1/2003 | Wang | 301/108.4 |
| 2004/0195905 A1 * | 10/2004 | French et al. | 301/37.28 |

FOREIGN PATENT DOCUMENTS

| | | |
|---|---|---|
| DE | 41 22 159 A 1 | 1/1993 |
| JP | 2000016001 A | 1/2000 |
| WO | WO91/00197 | 1/1991 |

* cited by examiner

*Primary Examiner*—Russell D. Stormer
*Assistant Examiner*—Kip Kotter
(74) *Attorney, Agent, or Firm*—Wayne L. Lovercheck

(57) ABSTRACT

A wheel insert for removable placement within the apertures of the wheel rim of a vehicle wheel for preventing mud, dirt and debris from entering and blocking the apertures and marring the vehicle wheel includes a tubular body portion insertable into the aperture, a closed end flange engaging the rear surface of the wheel rim, a front flange spaced from the end flange for engaging the front surface of the wheel rim, and a pair of inwardly projecting receiving flanges adjacent the front flange for holding a stiffening and closure member that locks the wheel insert within the aperture and to the wheel rim with the stiffening and closure member having both reflective and decorative elements for enhancing the safety and aesthetic features of the wheel insert by enhancing the visibility of the vehicle wheels at night.

21 Claims, 4 Drawing Sheets

WHEEL PLUGS FOR VEHICLE WHEELS

BACKGROUND OF THE INVENTION

The present invention pertains to plugs or inserts for plugging apertures in machines, accessories parts and structural members, and more particularly pertains to plugs for plugging the apertures spaced about the rims of truck wheels.

For reasons of aesthetics and personal taste, vehicles wheels for automobiles, jeeps, SUVs, and trucks now come in a wide variety of styles and designs, with much of the styling and design being located on and arranged about the rim of the wheel. More specifically, the external or outwardly facing wheel rim can include numerous apertures spaced about the rim and the axle of the vehicle. The apertures spaced about the wheel rim can be in any geometric or decorative configuration with such configurations ranging from diamonds and octagons to crescent and s-shaped curves.

However, one prominent problem with such wheels, whether they are of standard or of customized design, is that dirt, debris and mud can collect in and occlude the apertures spaced about the rim of the wheel. In addition, mud, dirt, and debris will get onto the wheels themselves. This is undesirable for both safety and aesthetic reasons as many types of wheel rims are manufactured from high-grade, polished aluminum that must be kept clean and dirt free.

Thus, the use of plugs is one method utilized to prevent the collection and passage of dirt, mud and debris into and through the apertures spaced about the wheel rims. For example, the Winters patent (U.S. Pat. No. 6,439,670) discloses a wheel hole insert that includes a liner for insertion into the wheel hole and which is held in place by tabs or detents that engage the rear surface of the wheel rim. In addition, an exterior member, integrally formed to the liner covers the wheel hole and is externally visible.

Despite the ingenuity of the above device, there remains a need for a plug or insert that can be easily inserted into the wheel hole and locked into place, and that includes an external surface that both covers and blocks the wheel hole and incorporates both decorative and reflective qualities and features.

BRIEF SUMMARY OF THE INVENTION

The present invention comprehends wheels plugs or inserts for fitting into and covering the apertures spaced about the rim of an automotive vehicle wheel, and which are especially suitable for use with the wheel rims of trucks.

The wheel insert of the present invention includes a wheel plug that includes a tubular body portion, and the tubular body portion includes an inner annular surface and an outer annular surface. A cavity is formed in the tubular body portion, and integrally formed at one end of the tubular body portion is an end flange having a diameter greater than the diameter of the tubular body portion and the diameter of the aperture of the wheel rim. The end flange is closed thus closing off the cavity at that end. The tubular body portion also includes a front flange integrally formed thereto and spaced from the end flange. The front flange has a diameter greater than the diameter of the tubular body portion and the aperture of the wheel rim but is slightly less than the diameter of the end flange. A channel or groove is formed between the end flange and the front flange, and the channel engages and seats on the annular inner surface of the wheel rim.

The tubular body portion also includes a pair of inner annular receiving flanges that are located adjacent the front flange and inwardly project from the inner annular surface of the tubular body portion slightly into the cavity of the tubular body portion. The wheel insert is preferably composed of a pliable and resilient rubber compound to facilitate the insertion and seating of the wheel insert within the aperture of the wheel rim.

After the wheel insert has been inserted and seated within the aperture of the wheel rim, a stiffening and supporting member can be pressed into the space formed between the inner annular receiving flanges for completely covering and blocking the aperture and securing the wheel insert in position within the aperture of the wheel rim.

It is an objective of the present invention to provide a wheel insert for the aperture of a wheel rim that can be easily installed in the aperture and removed therefrom.

It is another objective of the present invention to provide a wheel insert for the aperture of a wheel rim that can be configured to fit apertures of various geometric forms and shapes.

It is yet another objective of the present invention to provide a wheel insert for the aperture of a wheel rim that is composed of a resilient and durable material that facilitates the insertion of the wheel insert into the aperture of the wheel rim.

Still yet another objective of the present invention is to provide a wheel insert for the aperture of a wheel rim that includes a stiffening and supporting member that closes off the cavity of the wheel insert thereby preventing dirt, mud and debris from collecting therein and locks the wheel insert to the wheel rim.

A still further objective of the present invention is to provide a wheel insert for the aperture of a wheel rim wherein the stiffening and supporting member is removably insertable to the wheel insert.

Another objective of the present invention is to provide a wheel insert for the aperture of a wheel rim wherein the stiffening and supporting member can have a reflective and decorative appearance to enhance the visibility of the lower portion of the vehicle and the aesthetic appearance of the wheel insert.

These and other objects, features and advantages will become apparent to those skilled in the art upon a perusal of the following detailed description read in conjunction with the accompanying drawing figures and appended claims.

DETAILED DESCRIPTION OF THE INVENTION

Illustrated in FIGS. 1 through 10 is a wheel insert 10 for insertion into the apertures spaced about the wheel rim of a vehicle wheel, and that is especially designed for plugging the apertures of aluminum truck rims. The present invention has both utilitarian and decorative/aesthetics features for plugging the apertures of the wheel rims to prevent dirt, mud, and debris from lodging in and occluding the apertures and from passing through the apertures and muddying the vehicle wheels. Wheel insert 10 includes a wheel plug 30 and a closure member 60.

Figure 1:
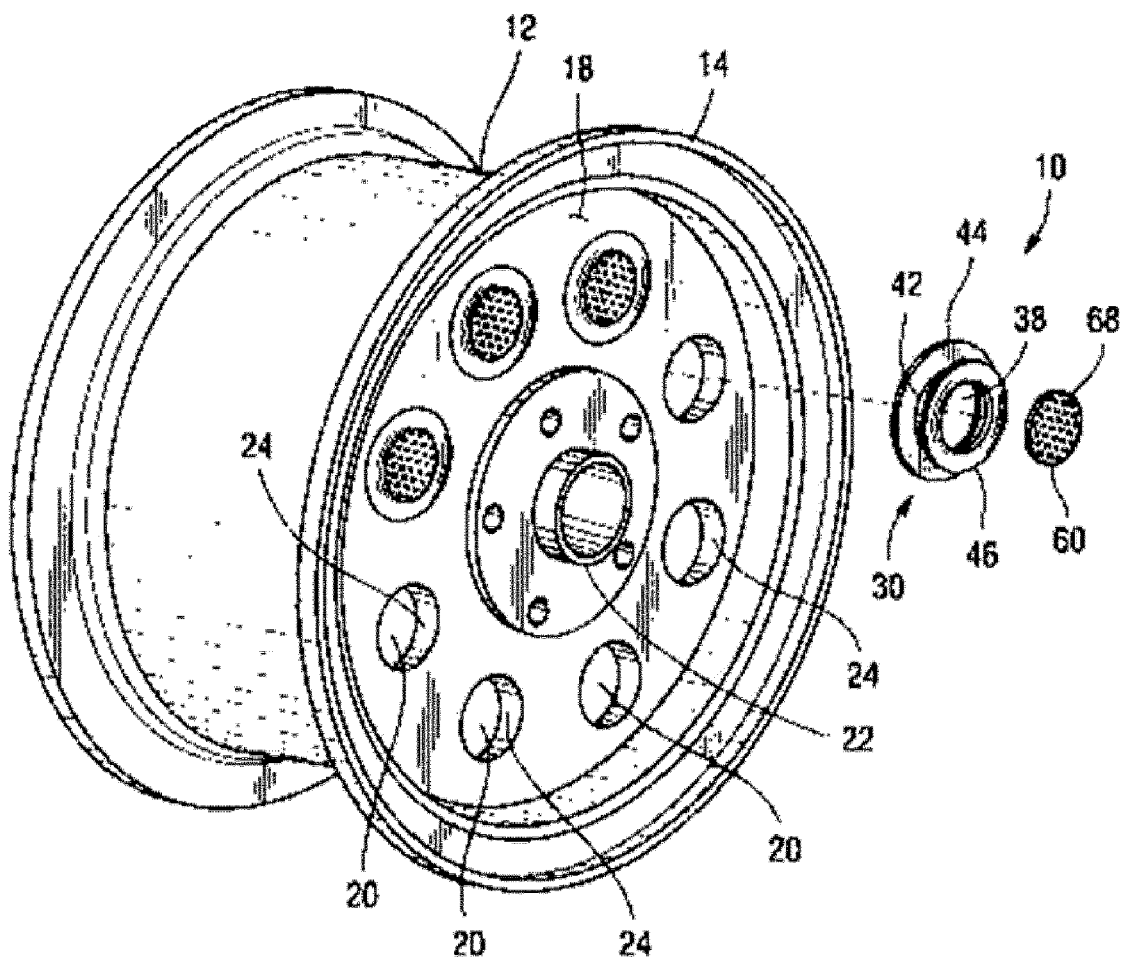
FIG. 1 is a perspective view of the wheel insert of the present invention illustrating the alignment and subsequent placement of the wheel insert and the stiffening member into an aperture located on a wheel rim of a vehicle wheel.
Figure 2:
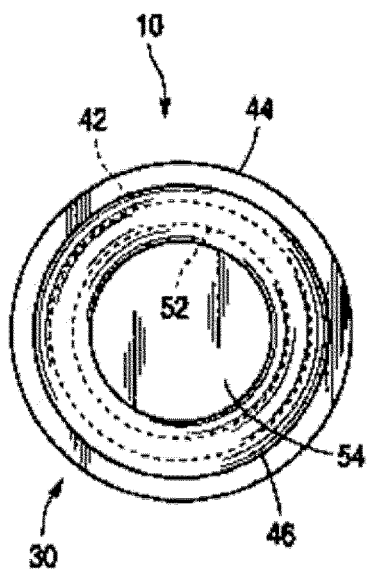
FIG. 2 is a front elevational view of the wheel insert first shown in FIG. 1.
Figure 8:
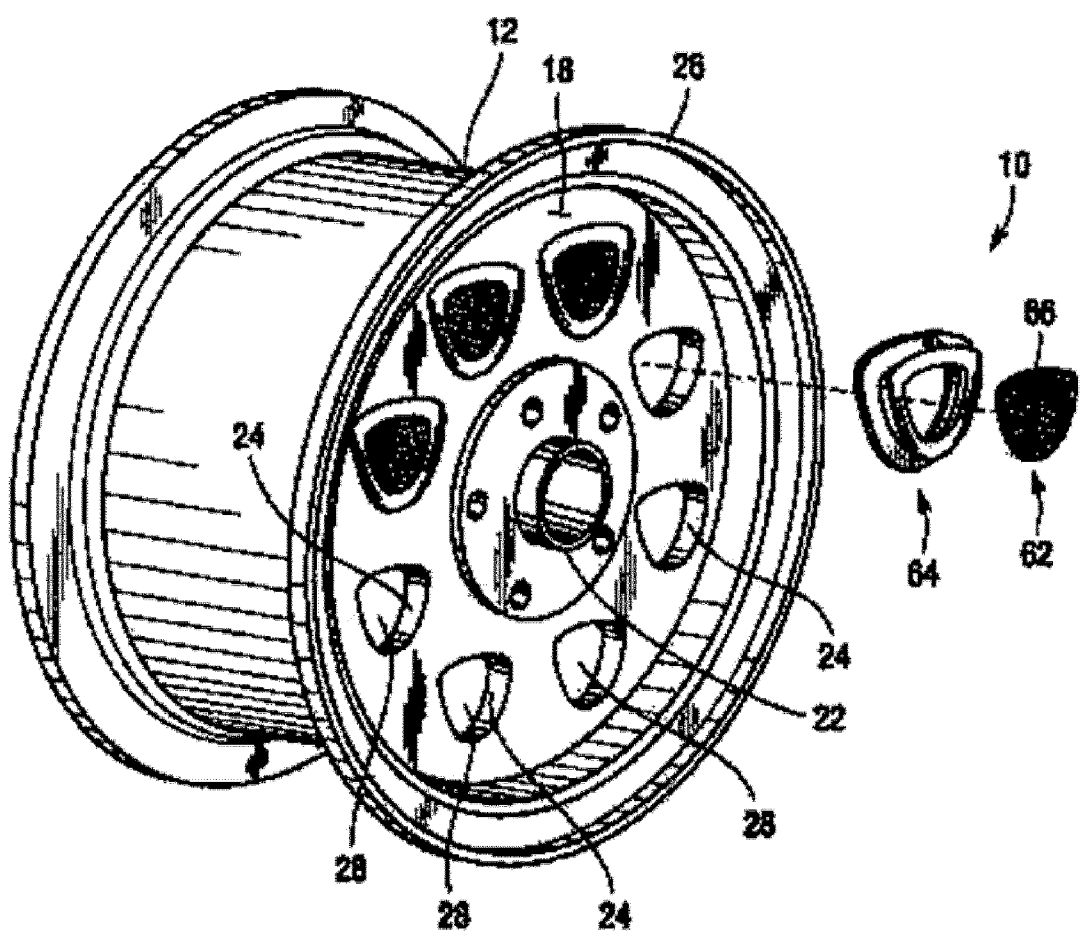
FIG. 8 is a perspective view of the wheel insert illustrating an alternative geometric configuration for the wheel insert from that shown in FIG. 1.
Figure 9:
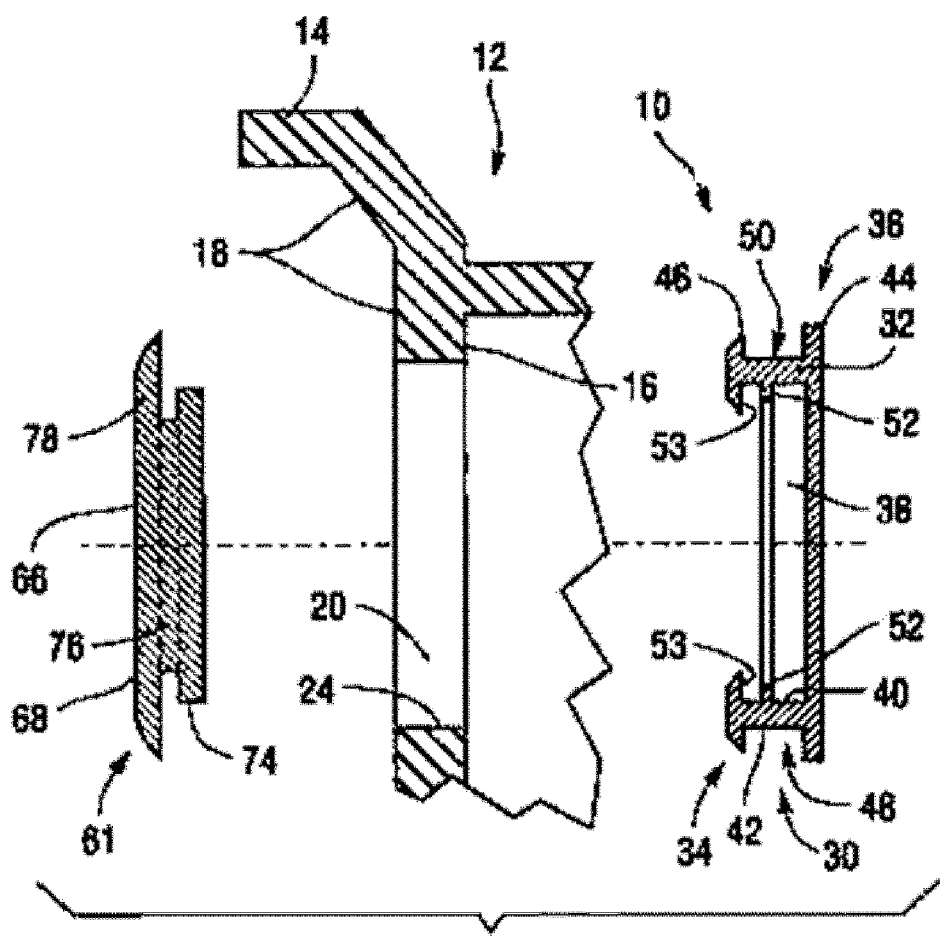
FIG. 9 is an exploded view of the wheel insert of the present invention illustrating the alignment of the stiffening and closure member, the wheel insert and the aperture of the wheel rim of the vehicle wheel.
Figure 10:
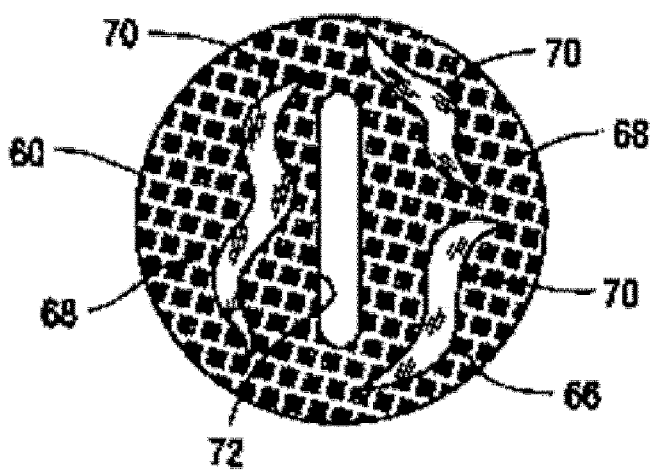
FIG. 10 is a front elevational view of the wheel insert of the present invention illustrating a decorative feature impressed upon the stiffening and closure member.

As shown in FIGS. 1, 8 and 9, a representative vehicle wheel 12 is shown that includes a wheel rim 14, and wheel rim 14 includes a rear surface 16 and an opposite front surface 18. Wheel rim 14 includes a plurality of apertures 20 spaced about the hub or axle 22, and each aperture 20 is defined by a circumferential inner wheel rim surface 24. Custom-made wheel rims for trucks and sports cars can include apertures having various designs and geometric configurations. Thus, FIG. 8 illustrates vehicle wheel 12 having a wheel rim 26 wherein apertures 28 circumjacent the hub or axle 22 have a triangular configuration.

As shown in FIGS. 1 through 9 wheel insert 10 includes a wheel plug 30 that is insertably removable into each aperture 20 of wheel rim 14, and wheel plug 30 is composed of a formed rubber or other suitable material that is resilient, durable and somewhat pliable to facilitate the insertion and removal of wheel plug 30. Wheel plug 30 includes a tubular or cylindrical main body portion 32. Tubular body portion 32 includes a first end 34 that is the exterior or outer end when wheel plug 30 is mounted within aperture 20 of wheel rim 14, and an opposite second end 36 that is the interior end and not viewable when wheel plug 30 is disposed within aperture 20. Extending into tubular body portion 32 from first end 34 is a cavity or hollow 38 that allows tubular body portion 32 to slightly deform or flex inward during insertion of tubular body portion 32 into aperture 20.

As illustrated in FIGS. 2 through 7, tubular body portion 32 of wheel plug 30 includes an inner annular surface 40 and an opposite outer annular surface 42. Outer annular surface 42 is bounded or delimited by an end flange 44 and a front flange 46. Outer annular surface 40 as delimited by end flange 44 and front flange 46 in effect forms an annular seating channel or groove 48. End flange 44 is integrally formed from tubular body portion 32 adjacent second end 36, and front flange 46 is integrally formed from tubular body portion 32 adjacent first end 34. The outside diameter of end flange 44 is greater than the outside diameter of tubular body portion 32 as defined by outer annular surface 42, and outside diameter of front flange 46 is also greater than the outside diameter of tubular body portion 32 as defined by outer annular surface 42. In addition to properly seating and securing wheel plug 30 within aperture 20, the outside diameter of end flange 44 is greater than the outside diameter of front flange 46 for engaging rear surface 16 of wheel rim 14. Front flange 46 and end flange 44 are in coaxial alignment with each other, and when wheel plug 30 is inserted within aperture 20, end flange 44 abuts rear surface 16 of wheel rim 14 that circumscribes aperture 20, groove 48 defined by outer annular surface 42 of tubular body portion 32 contacts and engages inner annular surface 24 of wheel rim 14 and front flange 46 contacts that portion of front surface 18 of wheel rim 14 that circumscribes aperture 20. Wheel insert 10 thus includes a continuous exterior surface, or continuous exterior seating and engaging surface 50, comprising end flange 44, groove 48 defined by outer annular surface 42, and front flange 46 for seating and securing wheel insert 10 within aperture 20 and in abutting relationship to the corresponding surfaces—surface rear 16, inner rim surface 24, and front surface 18—of wheel rim 14. The spacing of front flange 46 from end flange 44, and the respective outside diameter of front flange 46 allows for the force fitting of front flange 46 through aperture 20 of wheel rim 14 concomitant with the engagement of groove 48 with the circumferential inner wheel rim surface 24 resulting in the securement and seating of wheel plug 30 within aperture 20.

As shown in FIGS. 2 through 7, a pair of inwardly extending or projecting receiving flanges 52, 53 are located adjacent front flange 46 and first end 34 of tubular body portion 32. Receiving flanges 52, 53 are spaced from each other, and receiving flanges 53 may be formed by the front inner annular extension of front flange 46. Receiving flanges 52, 53 extend slightly into cavity 38 of tubular body portion 32, and receiving flanges 52, 53 are also in coaxial alignment with end flange 44 and front flange 46.

Figure 5:
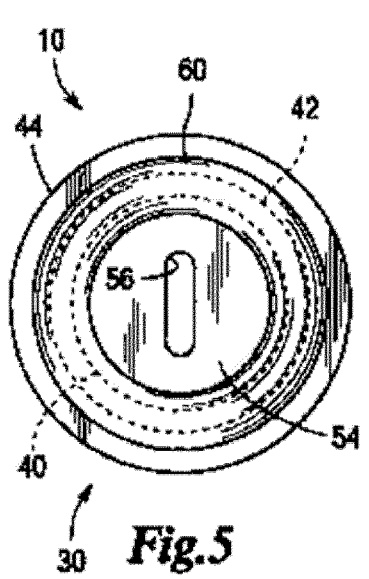
FIG. 5 is a front elevational view of the wheel insert first shown in FIG. 1 illustrating the stiffening and closure member having a slot cut on its surface to allow passage therethrough of a valve stem of the vehicle wheel.

As illustrated in FIGS. 2 through 7, end flange 44 is substantially closed so that cavity 38 of tubular body portion 32 is closed off at second end 36 thereby preventing dirt, mud, and debris from entering and passing through aperture 20. However, because the valve stem (not shown) of vehicle wheel 12 extends outwardly from wheel 12, provision must be made for accommodating the extension of the valve stem. Thus, as shown specifically in FIG. 5 and FIG. 7, end flange 44 includes on its membrane or cylindrical surface 54 a means for allowing the passage therethrough of the valve stem so that wheel insert 10 can properly seat within aperture 20 and avoid having the valve stem from hinder or obstruct the stable placement and seating of wheel insert 10 on wheel 12. In FIG. 5 the means for allowing the passage of the valve stem includes a slot 56 formed on membrane 54 of end flange 44 that substantially closes off cavity 38 at second end 36 while allowing passage therethrough of the valve stem; while in FIG. 7 the means to allow the passage of the valve stem includes a cross or T-shaped slit 58 formed on membrane 54 of end flange 44. Membrane 54 substantially closes off cavity 38 but accommodates the valve stem.

Figure 3:
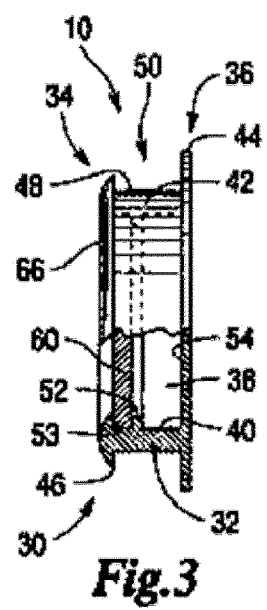
FIG. 3 is a side elevational view of the wheel insert illustrating the end flange, the front flange, the cavity and the inner receiving flanges.
Figure 4:
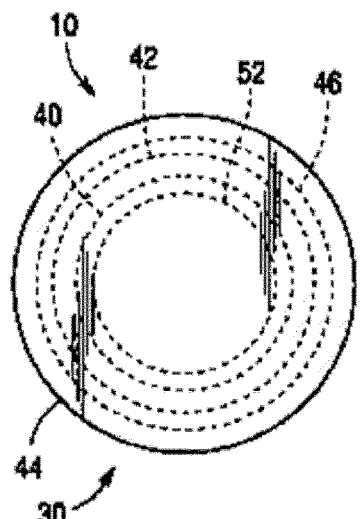
FIG. 4 is a rear elevational view of the wheel insert first shown in FIG. 1.
Figure 6:
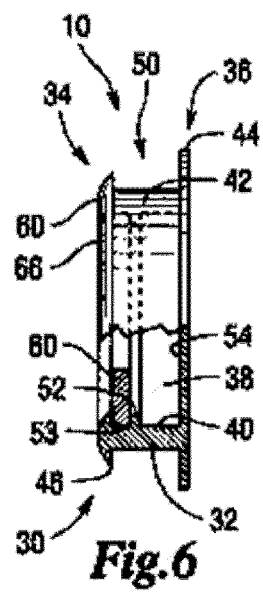
FIG. 6 is a side elevational view of the wheel insert first shown in FIG. 1 illustrating the placement and fitting of the stiffening and closure member between the inner receiving flanges of the wheel insert.
Figure 7:
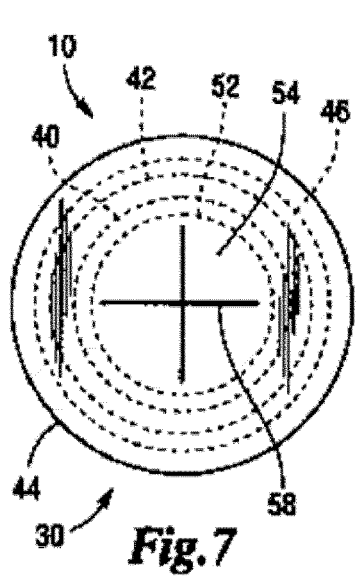
FIG. 7 is a rear elevational view of the wheel insert illustrating a cross-shaped cut on the end flange for allowing the valve stem of the vehicle wheel to pass therethrough.

While membrane 54 of end flange 44 closes off cavity 38 at second end 36, cavity 38 is open at first end 34 adjacent front flange 46 and inner receiving flanges 52, 53. In order to close off first end 34, and also to facilitate the locking of wheel plug 30 to vehicle wheel 12, a removable locking and closure means is disclosed for fitting between the inwardly projecting receiving flanges 52, 53 and thereby closing off cavity 38 at first end 34. The removable locking and closure means has utilitarian and decorative/aesthetic aspects and is preferably a stiff plastic or metal member 60, either circular or of other geometric configurations, sized so as to be pressed through first end 34 of wheel plug 30 and slightly into the entrance of cavity 38 for seating and fitting between inner receiving flanges 52, 53. Stiffening and closure member 60 achieves an interference fit with wheel plug 30 when pressed into receiving flanges 52, 53 after wheel insert 10 has been mounted within aperture 20 of vehicle wheel 12. As shown in FIGS. 3 and 6, the outside diameter of stiffening and closure member 60 is at least equal to the inside diameter of inner annular surface 40 located between inner receiving flanges 52, 53. It should be noted that the shape of closure member 60 could vary to correspond to the shape of wheel plug 30. Thus, a triangular-shaped closure member 62 is shown in FIG. 8 for press fitting to triangular-shaped wheel plug 64 that is also shown in FIG. 8.

As shown in FIGS. 1 and 8-10, external surfaces 66 of closure members 60 and 62 can be composed of a reflective material 68 to enhance the visibility of vehicle wheels 12, especially at night. Reflective material 68 can also be applied or affixed as a coating to external surfaces 66 of closure members 60 and 62. External surfaces 66 of closure members 60 and 62 can be decorated with various types of designs, colors, and markings to enhance their aesthetic appearance with a representative design 70 shown on external surface 66 of stiffening and closure member 60 of FIG. 10. In addition, a means to accommodate the passage of the valve stem is included on at least one of the set of stiffening and closure members 60 and 62 similar to elongated slot 56 shown in FIG. 5 and cross-shaped slit 58 shown in FIG. 7 to allow passage therethrough of the valve stem. Such means is in the form of a slot 72 formed on at least one of stiffening and closure members 60 and 62 and would align with slot 56 and cross-shaped slit 58. Closure members 60 and 62 having the decorative and/or reflective features on their external surface 66 have three primary functions: 1.) closure members 60 and 62 close off cavity 38 of tubular body portion 32 of wheel plug 30 thereby preventing mud, dirt, and debris from collecting in cavity 38 and collecting on vehicle wheel 12; 2.) the seating of closure members 60 and 62 within receiving flanges 52 acts as a lock forcing outer annular surface 42 of tubular body portion 32 against inner wheel rim surface 24 thereby inhibiting and preventing wheel plug 30 from being pushed out of aperture 20 or falling out of aperture 20; and 3.) with external surface 66 of closure members 60 and 62 covered or coated with reflective material 68, the lower portion of the vehicle, including vehicle wheels 12, are more readily visible—and visible from a further distance—for oncoming cars, trucks, motorcycles and other vehicles during the night or for nighttime driving. Thus, the safety of all vehicles in the vicinity is increased and augmented.

As illustrated in FIG. 9, wheel insert 10 is made up of wheel plug 30, which is inserted into aperture 30 from rear surface 16 through to front surface 18 where stiff closure member 60 is forced into cavity 38 in tubular main body portion 32 of wheel plug 30 from surface 18 of wheel 12.

Stiff closure member 60 is generally disc shaped and when inserted in cavity 38, decorated or reflective surface 68 is surrounded by front flange 46 and partially covered by receiving flange 53. In an alternative embodiment, a stiff closure member 61 may be provided having closure portion 74, body portion 76 and cover portion 78. Closure portion 74 is generally disc shaped and forced fitable in cavity 38 of main body portion 32 of wheel plug 30. Closure member 61 also has body portion 76, which extends generally through the annular opening in outer inwardly projecting receiving flange 53. Finally, stiff closure member 61 has cover portion 78, which generally covers wheel plug 30 including the area of front flange 46 and receiving flange 53. Cover portion 78 has external surface 66, which may have a design 70 or may be reflective or decorated 68 as desired.

While a preferred embodiment of the invention, and alternative embodiments, have been set forth above, those skilled in the art will recognize that numerous modifications, alterations, and variations are possible and practicable and yet will still fall within the scope of the invention and the spirit of the appended claims.

What is claimed is:

1. A wheel insert for insertion into an aperture of a wheel rim of a vehicle wheel, comprising:
    a wheel plug including:
    a tubular body portion having a first end, an opposite second end, an inner annular surface and an outer annular surface;
    a cavity within the tubular body portion and defined by the inner annular surface;
    a closed end flange integrally formed at the second end;
    a front flange integrally formed at the first end;
    a pair of inner receiving flanges adjacent the first end and projecting from the inner annular surface into the cavity;
    whereupon the end flange, the outer annular surface, and the front flange engage and contact the wheel rim when the wheel plug is pressed into the aperture for seating the wheel plug within the aperture and sealing off the aperture so that dirt, mud, and debris is prevented from reaching and collecting on the vehicle wheel; and
    a stiffening and closure member for mounting between the inner receiving flanges so that the stiffening and closure member can seal off the cavity and lock the wheel plug in place within the aperture.

2. The wheel insert of claim 1 wherein said stiffening and closure member further comprises a closure portion to lock said wheel plug in place, a cover portion that generally overlies said wheel plug, and a body portion extending between said closure portion and said cover portion.

3. The wheel insert of claim 1 wherein the outside diameter of the end flange is greater than the diameter of the aperture so that the end flange is able to engage the wheel rim when the wheel plug is inserted into the aperture.

4. The wheel insert of claim 3 wherein the outside diameter of the front flange is greater than the diameter of the aperture so that the front flange can engage the wheel rim when the wheel plug is pressed through the aperture and seated therein.

5. The wheel insert of claim 4 wherein the end flange includes a membrane that closes off the cavity at the second end of the wheel plug.

6. The wheel insert of claim 5 wherein the membrane of the end flange includes a slot to allow the passage therethrough of a valve stem of the vehicle wheel to accommodate the valve stem when the wheel plug is inserted into the aperture.

7. The wheel insert of claim 5 wherein the membrane of the end flange includes a cross-shaped slit that allows the passage therethrough of a valve stem of the vehicle wheel for accommodating the valve stem when the wheel plug is inserted into the aperture.

8. The wheel insert of claim 7 wherein the insertion of the stiffening and closure member to the inner receiving flanges forcibly maintains the contact of the wheel plug against the wheel rim and thus facilitates the locking of the wheel plug in place within the aperture.

9. The wheel insert of claim 8 wherein the stiffening and closure member includes an external surface that is viewable when the stiffening and closure member is mounted to the inner receiving flanges of the wheel plug and the wheel plug is inserted into the aperture of the vehicle wheel.

10. The wheel insert of claim 9 wherein the external surface of the stiffening and closure member includes a reflective material.

11. The wheel insert of claim 9 wherein the external surface of the stiffening and closure member includes a decorative design.

12. A wheel insert for insertion into an aperture of a wheel rim of a vehicle wheel wherein the wheel rim includes a rear surface, a front surface, and an inner wheel rim surface circumjacent the aperture, the wheel insert comprising:
   a wheel plug including: a first end and a second end;
   a cavity extending substantially through the wheel plug from the first end to the second end;
   a continuous exterior seating and engaging surface extending from the first end to the second end for contacting the rear surface, the front surface and the inner wheel rim surface of the vehicle wheel when the wheel plug is inserted into the aperture of the vehicle wheel;
   a pair of spaced-apart inner receiving flanges adjacent the first end opposite of the exterior seating and engaging surface and extending slightly into the cavity;
   a removable locking and closure means for mounting between the inner receiving flanges in order to close off the cavity and maintain the contact of the continuous exterior seating and engaging surface with the wheel rim and locking the wheel plug in place within the aperture of the wheel rim; and
   means for allowing passage therethrough of a valve stem for the vehicle wheel formed on the second end of the wheel plug so that the valve stem can project into the cavity when the wheel plug is mounted within the aperture of the wheel rim of the vehicle wheel.

13. The wheel insert of claim 12 wherein the removable locking and closure means includes a stiffening and closure member that is pressed between the inner receiving flanges for securement therebetween.

14. The wheel insert of claim 13 wherein the stiffening and closure member is disc-shaped for corresponding to the shape of the wheel plug.

15. The wheel insert of claim 13 wherein the stiffening and closure member is triangular-shaped for corresponding to the shape of the wheel plug.

16. The wheel insert of claim 15 wherein the stiffening and closure member includes an external surface having a reflective material applied to the external surface for enhancing the visibility of the vehicle wheel at night.

17. The wheel insert of claim 16 wherein the external surface of the stiffening and closure member includes a decorative design.

18. A wheel insert for insertion into an aperture of a wheel rim of a vehicle wheel with the wheel rim including a rear surface, a front surface, and an inner wheel rim surface circumjacent the aperture, the wheel insert comprising:
   a wheel plug including: a first end and an opposite second end;
   a cavity extending substantially through the wheel plug from the first end to the second end;
   a membrane formed at the second end for closing off the cavity at that respective end;
   a cross-shaped slit formed on the membrane for allowing passage therethrough of a valve stem for the vehicle wheel;
   a continuous exterior seating and engaging surface extending from the first end to the second end for abutting the wheel rim when the wheel plug is inserted into the aperture;
   a pair of spaced-apart inner receiving flanges adjacent the first end opposite the continuous exterior seating and engaging surface with the inner receiving flanges projecting slightly into the cavity; and
   a removable locking and closure means for mounting to the inner receiving flanges in order to close off the cavity and maintain the abutting contact of the continuous exterior seating and receiving surface with the wheel rim to thereby lock the wheel plug in place within the aperture of the wheel rim.

19. The wheel insert of claim 18 wherein the membrane at the second end of the wheel plug includes a slot for allowing passage therethrough of the valve stem when the wheel plug is inserted into the aperture of the wheel rim.

20. The wheel insert of claim 19 wherein the removable locking and closure means includes a stiffening and closure member that is pressed between the inner receiving flanges for mounting thereto so that the stiffening closure member closes off the cavity of the wheel plug and facilitates the locking of the wheel plug to the vehicle wheel when the wheel plug is inserted into the aperture of the wheel rim.

21. The wheel insert of claim 20 wherein the stiffening and closure member includes an externally viewable surface, and the external surface has a reflective material affixed thereto for enhancing the visibility of the vehicle wheel during nighttime driving.

* * * * *